(12) United States Patent
Yamada et al.

(10) Patent No.: US 7,452,831 B2
(45) Date of Patent: Nov. 18, 2008

(54) FILTER MEDIUM

(75) Inventors: Kenko Yamada, Takatsuki (JP); Motoki Nagase, Ritto (JP)

(73) Assignee: Toray Industries, Inc. (JP)

( * ) Notice: Subject to any disclaimer, the term of this patent is extended or adjusted under 35 U.S.C. 154(b) by 45 days.

(21) Appl. No.: 10/549,027

(22) PCT Filed: Mar. 25, 2004

(86) PCT No.: PCT/JP2004/004140

§ 371 (c)(1),
(2), (4) Date: Oct. 13, 2005

(87) PCT Pub. No.: WO2004/087293

PCT Pub. Date: Oct. 14, 2004

(65) Prior Publication Data

US 2006/0172639 A1   Aug. 3, 2006

(30) Foreign Application Priority Data

Mar. 31, 2003 (JP) ............................. 2003-093483
Apr. 21, 2003 (JP) ............................. 2003-115449
May 22, 2003 (JP) ............................. 2003-144414

(51) Int. Cl.
B32B 5/26 (2006.01)

(52) U.S. Cl. .............................. 442/239; 442/2; 442/5; 442/136; 442/164; 442/414; 55/302; 55/378; 55/493; 55/521; 55/528; 95/278

(58) Field of Classification Search ...................... 442/2, 442/5, 136, 164, 239, 414; 55/302, 303, 55/304, 378, 379, 380, 381, 493, 521, 528; 95/278, 279, 281

See application file for complete search history.

(56) References Cited

U.S. PATENT DOCUMENTS

| | | | | |
|---|---|---|---|---|
| 4,840,838 A | * | 6/1989 | Wyss | 442/1 |
| RE33,023 E | * | 8/1989 | Hiers | 428/285 |
| 5,480,466 A | * | 1/1996 | Jackson et al. | 55/528 |
| 5,607,491 A | * | 3/1997 | Jackson et al. | 55/528 |
| 6,790,795 B2 | * | 9/2004 | Erb et al. | 442/35 |
| 6,808,553 B2 | * | 10/2004 | Kawano et al. | 95/287 |
| 6,844,275 B2 | * | 1/2005 | Yamamoto et al. | 442/136 |
| 2006/0166582 A1 | * | 7/2006 | Turkson | 442/270 |

FOREIGN PATENT DOCUMENTS

| | | |
|---|---|---|
| JP | 05-192520 | 8/1993 |
| JP | 06-81270 A | 3/1994 |
| JP | 09-075637 | 3/1997 |
| JP | 10-165729 | 6/1998 |
| JP | 2000-61224 A | 2/2000 |
| JP | 2000-140530 | 5/2000 |
| JP | 2000-334228 | 12/2000 |
| JP | 2001-276528 A | 10/2001 |
| JP | 2002-204909 | 7/2002 |

* cited by examiner

*Primary Examiner*—Arti Singh
(74) *Attorney, Agent, or Firm*—DLA Piper LLP (US)

(57) ABSTRACT

The filter fabric containing polyphenylene sulfide fibers, characterized in that the following (1) and/or (2) is satisfied is used to provide a filter fabric and a bag filter composed of the filter fabric excellent in dust-collecting efficiency and high in mechanical strength:

(1) Containing at least two webs, one of which on the dust side contains 50 wt % or more of heat resistant fibers with a fiber, diameter of 15 μm or less, while the other web on the clean side contains 50 wt % or more of heat resistant fibers with a fiber diameter of 20 μm or more (2) Containing a web containing polyphenylene sulfide staple fibers with their fineness kept in a range from 1 to 3 dtex and fluorine-based staple fibers with their fineness kept in a range from 2 to 4 dtex.

15 Claims, 4 Drawing Sheets

FILTER MEDIUM

TECHNICAL FIELD

This disclosure relates to a filter fabric that can function to collect and remove contaminants such as dust in air for cleaning the air. The filter fabric can be suitably used as a dust-collecting filter cloth for filtering the high temperature exhaust gases emitted from refuse incinerators, coal boilers, metal blast furnaces and the like, and also as a bag filter produced by sewing said filter cloth.

BACKGROUND

Filter fabrics used for cleaning air include filter fabrics for depth filtration and filter fabrics for surface filtration, and dust collectors use the filter fabrics for surface filtration. In the case of surface filtration, dust is collected on the surface of a filter fabric, to form a dust layer on the surface of the filter fabric, and dust is successively collected by the dust layer. When the dust layer grows to have a certain thickness, it is removed from the surface of the filter fabric by means of air pressure, and the operation to form a dust layer on the surface of the filter fabric is repeated again.

The fibers constituting the filter fabrics used for filtering the high temperature exhaust gases emitted from refuse incinerators, coal boilers, metal blast furnaces and the like include polyphenylene sulfide (hereinafter abbreviated as PPS) fibers, meta-aramid fibers, fluorine-based fibers, polyimide fibers, etc. respectively excellent in heat resistance and chemical resistance, and they are formed into nonwoven fabrics to be used as filter fabrics. Among them, PPS fibers are excellent in hydrolytic resistance, acid resistance and alkali resistance, and widely used as bag filters for dust collection of coal boilers.

Meanwhile, environmental regulations tend to be more severe in the world, and especially the PM2.5 regulations that are going to be enacted in USA may be applied also in Japan. To meet this situation, it is demanded that a filter with a higher dust-collecting efficiency and excellent dimensional stability at higher temperatures is available. The conventional electrostatic precipitators and cyclone separators cannot catch up with the demand, and it is desired that a nonwoven fabric filter with higher functions is available.

Moreover, when such filter fabrics are used, for example, in refuse incinerators, the chemical deterioration caused by high temperature exhaust gases and the chemicals, etc. contained in the exhaust gases takes place, and at the same time, in addition, the physical deterioration such as the wearing due to the contact with the cage and the flexing fatigue respectively caused by the pressure loss during exhaust gas filtration and by the pulse jetting during back-pulse cleaning also takes place. Therefore, the filter fabrics used in bag filters are required to have mechanical strength such as abrasion resistance, in addition to the above-mentioned heat resistance, chemicals resistance and hydrolytic resistance.

JP10-165729A proposes a filter cloth in which PPS fibers with a single fiber fineness of 1.8 d (2.0 dtex) or less are disposed as the surface layer. This method is certainly good in dust release characteristics and dust collection performance, but since it is insufficient in the stiffness at high temperature and abrasion resistance, it has such a problem that the filter cloth is physically progressively deteriorated and broken while it is used.

Furthermore, JP9-075637A proposes a filter cloth for bag filters, comprising a felt composed of fluorine staple fibers, in which the staple fibers in an upper layer portion are different in diameter from those in a lower layer portion. In this invention, a layer composed of fine fibers is disposed on the upstream side while thick fibers are disposed on the downstream side, to provide a filter cloth gently increasing in pressure loss, hence having a longer life. However, since fluorine fibers are relatively low in stiffness, there is a fear that the stiffness especially at high temperature declines. Furthermore, since fluorine fibers are insufficient in abrasion resistance, there is such a problem that the filter cloth is broken due to physical deterioration during use.

Moreover, in order to enhance the mechanical strength of a filter, JP7-16570B proposes a filter, in which a very fine fiber layer and a felt substrate layer are integrated by means of needle punching treatment to gradually decrease the distribution of the fibers capable of being made very fine, from the front surface to the back surface, and subsequently high pressure water jet punching is used to divide the fibers capable of being made very fine, to make the fibers very fine. This method can certainly enhance the dust-collecting efficiency owing to the very fine fibers of the felt surface layer, but has a problem that increased processing steps raise the processing cost.

Moreover, JP2000-334228A proposes a heat resistant filter cloth formed by laminating and integrating a lap consisting of, for example, polytetrafluoroethylene fibers and PPS fibers, a woven fabric composed of PPS fibers and a woven fabric composed of glass fibers in this order. This method is intended to enhance the mechanical strength by laminating a woven fabric composed of glass fibers, but has such problems that since the glass fibers are low in the resistance against alkaline chemicals, a heat resistant filter cloth using the chemical resistance of PPS fibers cannot be provided and that the strength decline during wet heat treatment (autoclave treatment) is very large.

JP2000-140530A proposes a filter cloth for high performance bag filters, obtained by blending, for example, PPS fibers and at least one or more kinds of fibers selected from polyimide fibers, polyamideimide fibers, polytetrafluoroethylene fibers and glass fibers. However, this invention uses PPS fibers with a 180° C. dry heat shrinkage rate of 3% or more, and does not improve the dimensional stability of a nonwoven fabric filter using PPS fibers. Furthermore, the filter cloth has a problem that when PPS fibers and other fibers are blended, blending irregularity is likely to occur.

JP2002-204909A proposes a filter cloth in which fluorine fibers are entangled with the surface of a heat resistant substrate. This method is certainly good in dust release characteristics, in preventing the penetration of particles into the filter cloth and in reducing the pressure loss during the operation of the dust collector. However, the filter cloth has such problems that since the air permeability in the initial state is so low as to increase the initial pressure loss, the life of the filter cloth is shortened, and that the capability of treating the exhaust gas greatly declines. Moreover, it has a problem that plural processing steps of laminating a web composed of staple fibers of polytetrafluoroethylene and entanglement treatment are necessary after preparation of a heat resistant felt substrate. Furthermore, it has a problem that the laminated web layer composed of staple fibers of polytetrafluoroethylene is separated by impact during use as a bag filter.

SUMMARY

We provide a filter fabric excellent in dust-collecting efficiency, small in the rise of pressure loss after pulse cleaning and high in mechanical strength.

Furthermore, we provide a dense filter fabric excellent in dust-collecting efficiency, excellent in thermal dimensional stability at high temperature and uniform in the fabric uniformity.

Our filter fabrics contain polyphenylene sulfide fibers, characterized in that the following (1) and/or (2) is satisfied:
(1) Containing at least two webs, one of which on the dust side contains 50 wt % or more of heat resistant fibers with a fiber diameter of 15 μm or less, while the other web on the clean side contains 50 wt % or more of heat resistant fibers with a fiber diameter of 20 μm or more
(2) Containing a web containing polyphenylene sulfide staple fibers with their fineness kept in a range from 1 to 3 dtex and fluorine-based staple fibers with their fineness kept in a range from 2 to 4 dtex.

We also provide a bag filter formed by sewing the filter fabric cylindrically.

A first aspect provides a filter fabric containing polyphenylene sulfide fibers, comprising at least two webs, one of which on the dust side contains 50 wt % or more of heat resistant fibers with a fiber diameter of 15 μm or less, while the other web on the clean side contains 50 wt % or more of heat resistant fibers with a fiber diameter of 20 μm or more. Therefore, the filter fabric is excellent in dust-collecting efficiency, small in the rise of pressure loss after pulse cleaning and excellent in mechanical strength.

Furthermore, a second aspect provides a filter fabric containing polyphenylene sulfide fibers, comprising a web containing polyphenylene sulfide fibers, comprising a web containing polyphenylene sulfide staple fibers with their fineness kept in a range from 1 to 3 dtex and fluorine-based staple fibers with their fineness kept in a range from 2 to 4 dtex. Therefore, the filter fabric is excellent in dust-collecting efficiency, excellent in thermal dimensional stability at high temperature, uniform in the fabric uniformity, and having few defects such as pinholes.

MEANINGS OF SYMBOLS

1: web forming the filtration layer of dust side
2: woven fabric composed of heat resistant fibers (scrim)
3: web forming the filtration layer of clean side
4: particle counter (upstream)
5: filter fabric
6: particle counter (downstream)
7: manometer
8: air blower
9: pulse jet loading machine
10: flow meter
11: dust collection filter
12: vacuum pump
13: digital manometer
14: dust feeder
15: dust dispersing device
16: box for collecting the dust removed by pulse cleaning
17: atmospheric dust-containing air
18: air remaining after atmospheric dust removal
19: metered dust
20: dust-containing air
21: air remaining after dust removal

DETAILED DESCRIPTION

We found that a filter fabric containing polyphenylene sulfide fibers, which satisfies the following (1) and/or (2), has excellent properties:
(1) Containing at least two webs, one of which on the dust side contains 50 wt % or more of heat resistant fibers with a fiber diameter of 15 μm or less, while the other web on the clean side contains 50 wt % or more of heat resistant fibers with a fiber diameter of 20 μm or more
(2) Containing a web containing polyphenylene sulfide staple fibers with their fineness kept in a range from 1 to 3 dtex and fluorine-based staple fibers with their fineness kept in a range from 2 to 4 dtex.

That is, a first aspect provides a filter fabric containing polyphenylene sulfide fibers, comprising at least two webs, one of which on the dust side contains 50 wt % or more of heat resistant fibers with a fiber diameter of 15 μm or less, while the other web on the clean side contains 50 wt % or more of heat resistant fibers with a fiber diameter of 20 μm or more.

Furthermore, a second aspect provides a filter fabric containing polyphenylene sulfide fibers, comprising a web containing polyphenylene sulfide staple fibers with their fineness kept in a range from 1 to 3 dtex and fluorine-based staple fibers with their fineness kept in a range from 2 to 4 dtex.

Moreover, it is more preferred that both (1) and (2) are satisfied. The first aspect is explained below.

The polyphenylene sulfide (hereinafter abbreviated as PPS) fibers are fibers made of a polymer, in which 90% or more of its component units are phenylene sulfide structural units represented by —$(C_6H_4—S)$—. If the PPS fibers are used, a filter fabric excellent in heat resistance, chemical resistance and hydrolytic resistance can be obtained.

The filter fabric containing the PPS fibers contains at least two webs, one of which on the dust side contains 50 wt % or more of heat resistant fibers with a fiber diameter of 15 μm or less, while the other web on the clean side contains 50 wt % or more of heat resistant fibers with a fiber diameter of 20 μm or more. It is not preferred that the web on the dust side contains more than 50 wt % of heat resistant fibers with a fiber diameter of more than 15 μm, since the dust-collecting efficiency as a property of filter performance tends to decline owing to poor denseness. Furthermore, it is not preferred either that the web on the clean side contains more than 50 wt % of heat resistant fibers with a fiber diameter of less than 20 μm, since the mechanical strength of the filter fabric, if consisting of the web only, tends to decline.

The dust side refers to the face on which the dust-containing air contacts the filter fabric for the first time when the filter fabric is used for surface filtration. That is, it means the filter fabric surface on which dust is collected to form a dust layer. Furthermore, the face on the other side, namely, the face from which the air remaining after dust removal goes out, is defined as the clean side.

In the filter fabric, since the web on the clean side contains 50 wt % or more of heat resistant fibers with a fiber diameter of 20 µm or more, the filter fabric obtained can be excellent in mechanical strength such as dimensional stability and tensile strength. Since a nonwoven fabric obtained by entangling a web has void portions uniformly dispersed and excellent filtration properties compared with a woven fabric, it can be preferably used as a filter fabric. However, a nonwoven fabric formed from a web consisting of thin fibers only is not preferred, since it is low in tensile strength and dimensional stability, being insufficient in mechanical strength.

As the constitution of the heat resistant fibers constituting the filter fabric, in view of the balance among dust-collecting efficiency, pressure loss and mechanical strength, it is preferred that the web on the dust side contains 50 wt % or more of heat resistant fibers with a fiber diameter of 9 to 15 µm. Furthermore, it is preferred that the web on the clean side contains 50 wt % or more of heat resistant fibers with a fiber diameter of 20 to 40 µm. In the case where fibers other than the heat resistant fibers with a fiber diameter of 9 to 15 µm are blended as heat resistant fibers forming the web on the dust side, it is preferred that the web contains 50 wt % or less of heat resistant fibers with a fiber diameter of more than 15 µm to 40 µm. In the case where fibers other than the heat resistant fibers with a fiber diameter of 20 to 40 µm are blended as heat resistant fibers forming the web on the clean side, it is preferred that the web contains 50 wt % or less of heat resistant fibers with a fiber diameter of 9 µm to less than 20 µm.

Furthermore, it is preferred that the heat resistant fibers forming said web on the dust side contain 20 wt % or more of heat resistant fibers with a fiber diameter of 10 µm or less, since a higher dust-collecting efficiency can be obtained. It is more preferred that they contain 20 wt % or more of heat resistant fibers with a fiber diameter of 9 µm to 10 µm.

The heat resistant fibers forming a web contain at least PPS fibers, but can also have heat resistant fibers other than PPS fibers blended. The dust-collecting efficiency and the pressure loss as properties of filter performance are contradictory to each other. In general, the means for enhancing the dust-collecting efficiency include coating the filtration layer on its surface with a resin such as silicone resin or fluorine resin, to form a film, and using fibers with a smaller fineness as the fibers constituting the filtration layer. However, if such means are employed, the pressure loss tends to be higher, thereby shortening the life as a bag filter. If the fibers different in the property of being electrified are blended, an electric action works between fibers (triboelectric effect), allowing the dust-collecting efficiency to be enhanced. So, this is effective for achieving a good balance between the dust-collecting efficiency and the pressure loss. For this reason, it is preferred that especially the web on the dust side has heat resistant fibers other than PPS fibers blended. It is of course preferred that the web on the clean side has also heat resistant fibers other than PPS fibers blended.

As the heat resistant fibers other than PPS fibers, preferred are fibers selected from fluorine-based fibers, para-aramid fibers, meta-aramid fibers, polyimide fibers, carbon fibers and glass fibers. Especially fluorine-based fibers are preferred, since they have heat resistance higher than that of PPS fibers and are also excellent in chemical resistance. Furthermore, if the web on the dust side contains fluorine-based fibers, the low surface friction property of the fluorine-based fibers acts to allow the dust deposited on the surfaces of the fibers to be removed by pulse cleaning easily, and the rise of pressure loss can also be inhibited. Moreover, since the penetration and deposition of dust into the web can also be inhibited, the rise of pressure loss can also be inhibited similarly. As the fluorine-based fibers, fibers of any polymer, 90% or more of the recurring structural units of which are formed by a monomer having one or more fluorine atoms on its main chain or side chain, can be used. Fibers formed from a monomer having more fluorine atoms are more preferred. Examples of the polymer include tetrafluoroethylene-hexafluoropropylene copolymer (FEP), tetrafluoroethylene-fluoroalkylvinylether copolymer (PFA), ethylene-tetrafluoroethylene copolymer (ETFE), polytetrafluoroethylene (PTFE), etc. It is further preferred to use polytetrafluoroethylene (PTFE) as the fluorine-based fibers, since it is especially excellent in heat resistance, chemical resistance and low surface friction property.

It is preferred that each of the webs contains 10 wt % or more of PPS fibers. If the content is less than 10 wt %, the rate of heat resistant fibers other than PPS fibers is too large. So, the properties of PPS fibers per se may be impaired depending on the selected fibers. Furthermore, in the case where fibers other than PPS fibers are blended, it is preferred that the content of PPS fibers in the web is 90 wt % or less. If the content is more than 90 wt %, the rate of heat resistant fibers other than PPS fibers becomes very low, and the effect of the other fibers blended in enhancing the dust-collecting efficiency becomes low.

That is, in the case where PPS fibers and fluorine-based fibers are blended, it is preferred that the web contains 10 to 90 wt % of PPS fibers and 10 to 90 wt % of fluorine-based fibers. Still furthermore, it is preferred that the total rate of PPS fibers and fluorine-based fibers in a web as a whole is 70 wt % or more. It is not preferred that the total rate of PPS fibers, and fluorine-based fibers in the entire nonwoven fabric is less than 70 wt %, since the retention of strength after treatment at 160° C. for 200 hours in an autoclave, i.e., heat resistance declines.

The PPS fibers can be produced by heating phenylene sulfide polymer at a temperature higher than its melting point, for melt spinning into fibers, passing them through heated steam or hot bath, drawing and crimping. PPS staple fibers can be obtained by further cutting them to a desired length. In the drawing step, drawing in a relaxed state is preferred to drawing in a tensioned state, since the fibers can be stably passed through the step with few occurrences of fiber breaking, etc. Therefore, usually, drawing in a relaxed state is employed, but in this case, the Young's modulus of the PPS fibers becomes low. Heat treatment under tension is carried out in the drawing step, so that PPS fibers with a Young's modulus of 20 cN/dtex or more can be obtained. PPS fibers with a Young's modulus of 20 cN/dtex or more can be especially suitably used, since the dimensional stability of the filter fabric can be improved. This is especially preferred in the case where the filter fabric is used as a bag filter, since the dimensional stability against the impact during back-pulse cleaning by pulse jetting and against the stress due to the self weight of the dust deposited on the surface of the filter fabric can be improved. Furthermore, if PPS fibers with a Young's modulus of 20 cN/dtex or more are used, the mechanical strength of the filter fabric can be secured even in the case where fluorine-based fibers lower in mechanical strength than PPS fibers are blended.

The polytetrafluoroethylene fibers can be produced, for example, by an emulsion spinning method comprising the steps of mixing a matrix polymer and tetrafluoroethylene polymer to form an emulsion, and discharging said emulsion from a molding die into a coagulating bath for forming fibers (also called a wet emulsion spinning method or matrix spinning method). The polytetrafluoroethylene fibers can also be obtained without any problem by a paste extrusion method in which a paste obtained by mixing a plasticizing aid such as solvent naphtha with tetrafluoroethylene polymer is extrusion-molded, or a skiving method in which a heated molding of tetrafluoroethylene is skived into films, followed by splitting, or direct separation into filaments which are then burned and drawn into fibers.

Each of the webs can also contain glass fibers. Glass fibers are inferior to PPS fibers in chemical resistance (alkali resistance), but are high in heat resistance and low in cost. Glass fibers are artificial fibers obtained by drawing glass thinly, and since molten glass is drawn through numerous pores at high speed for being spun, fibers with a very small fineness can be obtained. So, they are very effective for enhancing the dust-collecting efficiency. It is preferred that the fiber diameter of glass fibers is in a range from 2 to 7 μm in view of the balance between the dust-collecting efficiency and the pressure loss as properties of filter performance.

As the method for producing the filter fabric, for example, a method comprising the steps of producing a web containing 50 wt % or more of heat resistant fibers with a fiber diameter of 15 μm or less as the web on the dust side, further producing a web containing 50 wt % or more of heat resistant fibers with a fiber diameter of 20 μm or more as the web on the clean side, and entangling and integrating both the webs can be suitably used. As the method for producing a web, a method in which heat resistant staple fibers, are passed through a carding machine to form a web can be suitably used. Furthermore, as the method for entangling and integrating webs, needling punching or water jet punching is preferred.

A generally known needle punching step is explained below. At first, raw fibers are fed onto a rotary drum cylinder having innumerable needles for paralleling fibers in a certain direction (carding step), and the obtained web is lapped in alternating directions at a certain rate on a lattice by means of a cross lapper. It can be said that the weight per unit area of the finally finished filter fabric is virtually decided by the quantity of the raw fibers fed in this case and the line speed. If a large quantity of raw fibers is fed at a low line speed, the weight per unit area of the web tends to be large, and if a small quantity of raw fibers is fed at a high line speed, the weight per unit area of the web tends to be small. The obtained web is compressed lightly by means of pressing rolls, to form a lap, and a needle punch is used to entangle the fibers in the thickness direction, for forming the web on the dust side or clean side.

It is preferred that the needling density of the needle punch is 300 needles/cm$^2$ or more in view of the strength, apparent density and air permeability of the filter fabric. It is not preferred that the needle density is too low, for such reasons that the fibers can be only weakly entangled with each other to lower the strength of the filter fabric, that since the apparent density also tends to be low, the filter fabric is so loosely meshed that the dust collection performance may become poor. It is not preferred either that the needle density is too large on the contrary, for such reasons that since the fibers are flawed by the needles, the strength of the filter fabric may decline, and that since the filter fabric more tends to shrink, the air, permeability becomes low to raise the pressure loss from the initial state of use for shortening the life, though the dust collection performance can be improved because of a higher apparent density.

From the above, it is preferred that the apparent density of the filter fabric is in a range from 0.1 to 1.5 g/cm$^3$ by adequately adjusting the needle punching condition. A more preferred range is from 0.1 to 0.6 g/cm$^3$. A filter fabric with an apparent density of lower than 0.1 g/cm$^3$ is not preferred, since the quantity of dust that cannot be collected increases. A filter fabric with an apparent density of higher than 0.6 g/cm$^3$ is not preferred either, since the air permeability is so small as to greatly raise the pressure loss when the filter fabric is used as a filter. It is also preferred that the air permeability is kept in a range from 10 to 80 cc/cm$^2$/sec by adequately adjusting the needle punching condition.

It is further preferred that the filter fabric has an at least three-layer structure having a web on the dust side laminated on one surface of a woven fabric (hereinafter called an scrim) composed of heat resistant fibers and having another web on the clean side on the other surface of the woven fabric. The filter fabric has sufficient mechanical strength even if it does not contain any scrim in a scrim-less constitution, in the case where the web on the clean side contains 50 wt % or more of heat resistant fibers with a fiber diameter of 20 μm or more. However, if the filter fabric has the three-layer structure, it can be more excellent in mechanical strength such as dimensional stability, tensile strength and abrasion resistance, and also excellent in dust-collecting efficiency. Moreover, in the case where the filter fabric is used as a bag filter, the wear of the filter fabric due to the contact with the cage can be reduced. In this case, the cage refers to a cylindrical skeleton used to be covered with a bag filter, and it us generally made of metal. Owing to filtration pressure and the pulse jet during back-pulse cleaning, the bag filter contacts the cage and is worn. If the three-layer structure is employed, the web on the clean side shows an effect of reducing the wear of the filter fabric. Especially in this invention, it is preferred that the web on the clean side contains 50 wt % or more of heat resistant fibers with a fiber diameter of 20 μm or more, since the wear of the filter fabric due to the contact with the cage can be greatly reduced.

Since the scrim serves to hold mechanical strength, a scrim with the tensile strength kept in a range from 350 to 900 N/5 cm can be suitably used.

The fibers constituting the scrim are only required to have heat resistance, and the fibers that can be used for constituting the scrim include para-aramid fibers, meta-aramid fibers, PPS fibers, polyimide fibers, fluorine-based fibers, carbon fibers, glass fibers, etc. Among them, in view of chemical resistance and hydrolytic resistance, it is preferred to use fibers selected from PPS fibers and fluorine-based fibers. As the fluorine-based fibers, those enumerated in the above explanation concerning webs can be used. PPS fibers are most preferred, since they have high mechanical strength. Furthermore, though fluorine-based fibers are inferior in mechanical strength to PPS fibers, it is preferred to use fluorine-based fibers when the filter fabric is used in an especially severe environment, since they have excellent heat resistance and chemical resistance.

As the fibers constituting the scrim, it is preferred to use spun yarns or multifilaments. Especially spun yarns can be more suitably used, for such reasons that they can be well entangled with the web, and that since they have a large surface area, the dust-collecting efficiency of the filter fabric is good.

The fineness of the fibers constituting the scrim is not especially limited, if the fibers have adequate strength. It is not preferred that the fineness is too large, since the meshes of the scrim tend to be closed depending on weaving conditions, to raise the pressure loss. It is not preferred either that the fineness is too small on the contrary, since the strength of the scrim per se declines to lower the mechanical strength of the filter fabric, though the weaving density declines to raise the air permeability, giving a tendency of lowering the pressure loss. It is preferred that the total fineness as yarns of the fibers constituting the scrim is in a range from 100 to 1000 dtex. A more preferred range is from 300 to 600 dtex. If the total fineness is less than 100 dtex, the effect of enhancing the dimensional stability and tensile strength by the lamination of the scrim cannot be sufficiently obtained. Furthermore, it is not preferred that the total fineness is more than 1000 dtex, for such a reason that since the air permeability of the filter fabric tends to be small, the initial pressure loss becomes high to shorten the life in the case where the filter fabric is used as a bag filter, though the dust-collecting efficiency as a property of filter performance is good, while the dimensional stability and tensile strength are excellent.

Especially it is preferred to use spun yarns of PPS staple fibers with a Young's modulus of 20 cN/dtex or more. PPS staple fibers with a Young's modulus of 20 cN/dtex or more are preferred, since they are excellent in dimensional stability.

It is preferred that the scrim has a coarsely meshed weave texture, lest the pressure loss as a property of filter performance should be affected. Usable general structures include plain weave, double weave, triple weave, twill weave, satin weave, etc. Especially a general purpose plain weave available at low cost can be preferably used, since a filter fabric with satisfactory performance can be obtained. As for the weaving density, it is preferred that the warp density is in a range from 15 to 40 threads/2.54 cm. A more preferred range is from 20 to 30 threads/2.54 cm. It is preferred that the weft density is in a range from 10 to 30 threads/2.54 cm. A more preferred range is from 15 to 25 threads/2.54 cm.

After the web on the dust side, the scrim and the web on the clean side are laminated in this order, they are entangled for integration. As the entangling means, at least one means selected from needle punching and water jet punching is preferred. In view of entanglement strength, it is preferred to employ needle punching, but depending on the required pressure loss and dust collection performance, water jet punching may be preferred as the case may be. Furthermore, using these means for combined treatment may provide a well-balanced filter fabric as the case may be. So, it is preferred to adequately select and employ the means.

In the filter fabric, if the web surface on the dust side where dust is deposited is partially fused, the dust release characteristics and the dust-collecting efficiency can be enhanced. As the method for partially fusing the web surface, such a method as singeing treatment or calendering processing can be used. Especially in the case where a filter fabric with a high dust-collecting efficiency is demanded, a filter fabric treated on both the web surfaces can be preferably used. Particularly, singeing treatment is applied to the dust side of the filter medium by means of a burner flame, infrared heater or the like, or a hot roll is used to press the dust side. Such a treatment causes the web surface of the dust side to be partially fused or to have its meshes closed, or further both the means can be used for calendering, to enhance the dust-collecting efficiency.

The second aspect is explained below. It is important that the filter fabric of this invention has a constitution comprising a web containing PPS staple fibers with their fineness kept in a range from 1 to 3 dtex and fluorine-based staple fibers with their fineness kept in a range from 2 to 4 dtex. This constitution, in which the two kinds of fibers with their diameters kept close to each other in a range from about 9 to about 15 μm are combined, is preferred, since blending irregularity is hard to occur when both the kinds of fibers are blended for use. Furthermore, a filter fabric composed of fibers with a fiber diameter of about 15 μm can be so constituted as to especially achieve a good balance between the strength and the denseness in the filter fabric. So, it can be suitably used for a filter. The balance between the strength and the denseness of a filter fabric is explained below. A filter fabric composed of fibers with a fiber diameter of 9 μm or smaller only is not preferred, since the mechanical strength, especially burst strength of the filter fabric declines, though the efficiency of collecting dust with particle sizes of 0.5 μm and less can be enhanced since the pore size of the filter fabric becomes small. Furthermore, in the case of a filter fabric composed of fibers with a fiber diameter of 9 μm, or smaller only, it can be considered to increase the weight per unit area of the filter fabric for securing the mechanical strength. However, this method is not preferred, since in the case where the weight per unit area of the filter fabric is set, for example, at 900 g/m$^2$ or more, the apparent density of the nonwoven fabric becomes very high to lower the air permeability and to raise the pressure loss. On the contrary, a filter fabric composed of fibers with a fiber diameter of 17 μm or larger only is not preferred either, since the pore size of the filter fabric becomes so large as to lower the efficiency of collecting dust with particle sizes of 0.5 μm and less, though the burst strength can be enhanced. Therefore, a filter fabric composed of fibers with the fiber diameter kept in a range from about 9 to about 15 μm is preferred, since it is excellent in the balance between the strength and the denseness in the nonwoven fabric.

For conversion between the fineness of a fiber and the diameter of the fiber, if the fiber has a round cross-sectional form, the specific weight is used for calculation. If the fiber has an irregular cross-sectional form, the mean value of the distances from the center of gravity to the respective vertexes (including acute and obtuse internal angles) of the polygon in a polygonal cross-sectional form of the fiber is defined as the diameter of the fiber. In the case of an ellipsoidal fiber, the mean value of the major axis and the minor axis is defined as the diameter of the fiber. The specific weight employed for PPS fibers is 1.34, and the specific weight employed for fluorine-based fibers, 2.30.

Therefore, the diameter of PPS staple fibers with their fineness kept in a range from 1 to 3 dtex is from 9.7 to 16.9 μm, and the diameter of fluorine-based staple fibers with their fineness kept in a range from 2 to 4 dtex is from 10.5 to 14.9 μm.

In the filter fabric, it is preferred that PPS staple fibers and fluorine-based staple fibers are blended to form a nonwoven fabric. It is preferred that the fiber length of the PPS staple fibers and the fluorine-based staple fibers is in a range from 0.2 to 140 mm. It is not preferred that the fibers are longer than 140 mm, since the blending of fibers is insufficient, not allowing the fabric uniformity to be uniform. Especially in the case where fibers are blended using an opener, it is more suitable that the fiber length is in a range from 35 to 80 mm. In the case where the fibers are blended while they are dispersed in water, it is more suitable that the fiber length is in a range from 0.2 to 10 mm. It is not preferred that the fibers have a fiber length of less than 0.2 mm, for such reasons that the lengths of the fibers cut in the cutting step become irregular, and that since the fibers very often adhere to the blade in the cutting step, they do not pass through the step smoothly.

It is also preferred that the filter fabric contains a woven fabric composed of heat resistant fibers, namely, scrim. A two-layer structure having a web laminated on one surface of the scrim can also be used, but at least a three-layer structure having webs laminated on both the surfaces of the scrim is especially preferred.

The filter fabric can be produced, for example, by a method comprising the steps of blending PPS staple fibers with a fineness of 1 to 3 dtex and fluorine-based staple fibers with a fineness of 2 to 4 dtex, passing the blended fibers through a carding machine, to form a web, laminating it on an scrim, and entangling and integrating the laminate by needle punching treatment. The blending in this case can be blending using a general opener, or blending by means of aeolian transport can also be used without any problem.

As the PPS fibers, fluorine-based fibers, scrim, etc., those enumerated before can be suitably used. Furthermore, also as the web entangling method, etc., the above-mentioned methods can be suitably used.

As the filter fabric, a filter fabric having a microporous polytetrafluoroethylene film laminated on it can also be suitably used. Laminating and bonding a microporous polytetrafluoroethylene film is preferred, since the efficiency for collecting fine dust can be enhanced. Laminating a microporous polytetrafluoroethylene film on a filter fabric composed of polytetrafluoroethylene fibers has a disadvantage that adhesiveness is rather poor in view of the nature of the polymer. Since the filter fabric of this invention is higher in adhesiveness than a filter fabric composed of polytetrafluoroethylene fibers only, because of the presence of PPS fibers, it also has an effect that lamination is easier.

The filter fabric obtained like this can be sewn into a bag, and can be suitably used as a bag filter in need of heat resistance, for collecting the exhaust gas of a refuse incinerator, coal boiler, metal blast furnace or the like. It is preferred that the sewing threads used for the sewing are yarns made of the same material having chemical resistance and heat resistance as that of the fibers constituting the woven fabric, and PPS fibers, fluorine-based fibers or the like can be adequately used.

Our filter fabrics are explained below in more detail in reference to examples, but is not limited thereto or thereby.

Meanwhile, the methods for measuring the respective physical properties of filter fabrics are as follows.

[Weight Per Unit Area]

A filter fabric was cut into a 400 mm square, and the weight per unit area of the filter fabric was calculated from its weight.

[Thickness]

The thickness of a filter fabric was measured using a thickness dial gauge (pressing pressure 250 g/cm$^2$=0.000245 Pa). Measurement was made at six places selected at random, and the mean value was obtained.

[Stiffness]

The stiffness of a filter fabric was measured based on the Gurley method specified in JIS L 1096. The filter fabric was cut to have a length of 63.5 mm and a width of 25.4 mm, and measurement was made once each on the front and back surfaces. Four samples were measured.

[Burst Strength]

The burst strength of a filter fabric was measured based on the burst strength method specified in JIS L 1096. Measurement was made at five places selected at random.

[Air Permeability]

The air permeability of a filter fabric was measured based on the Frazier method specified in JIS L 1096. Measurement was made at six places selected at random.

[Dust-collecting Efficiency for Dust in the Air]

Figure 1:
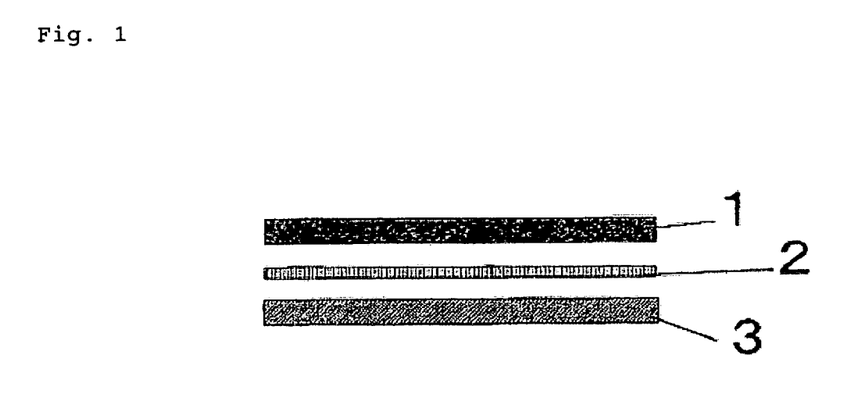
FIG. 1 is an exploded sectional view showing the filter fabric as an example.
Figure 2:
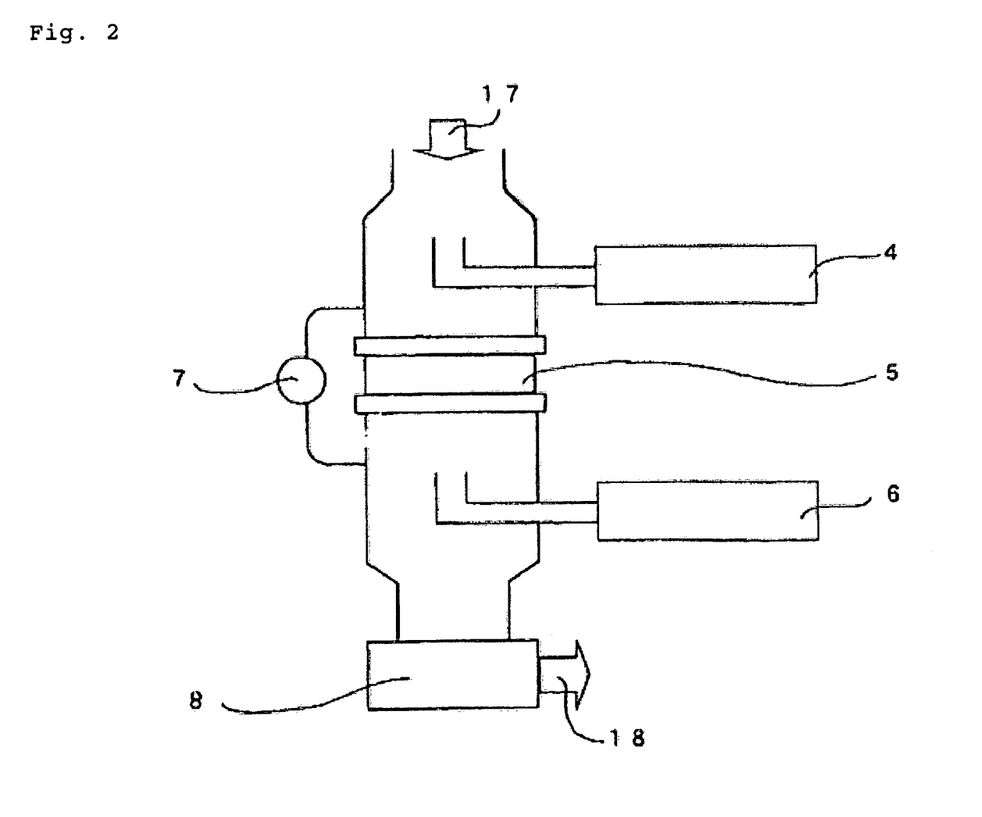
FIG. 2 is a schematic drawing showing an instrument for measuring the dust-collecting efficiency of the filter fabric for dust in the air.

The dust-collecting efficiency of a filter fabric was measured by a method of counting the particles of dust in the air using the instrument of FIG. 2. That is, in FIG. 2, an air stream with a filtration air velocity of 1 m/min was made to pass through a filter fabric 5 (170 mm diameter) for 5 minutes by an air blower 8 installed downstream of the filter fabric 5, and the number A of particles of dust (particle size 0.3 to 5 μm) in the air upstream of the filter fabric 5 was counted using a particle counter (upstream) 4 produced by RION. At the same time, the number B of particles of dust (particle size 0.3 to 5 μm) in the air downstream of the filter fabric 5 was couted by a particle counter (downstream) 6 produced by the same company. Three samples were measured. From the obtained results of measurement, the collecting efficiency (%) was obtained from the following formula:

$$(1-(B/A)) \times 100$$

where A: Number of particles of dust in the upstream air
B: Number of particles of dust in the downstream air The dust-collecting efficiency for dust in the air was judged according to the following criterion:
○: The efficiency of collecting dust with particle sizes of 1 μm and less is 50% or more (good)
Δ: Said efficiency is from 45% to less than 50% (rather good)
×: Said efficiency is less than 45% (poor)

[Pressure Loss]

The pressure loss by a filter fabric 5 during the measurement of dust-collecting efficiency for dust in the air was read using a manometer 7.

[Pressure Loss after Pulse Cleaning]

Figure 3:
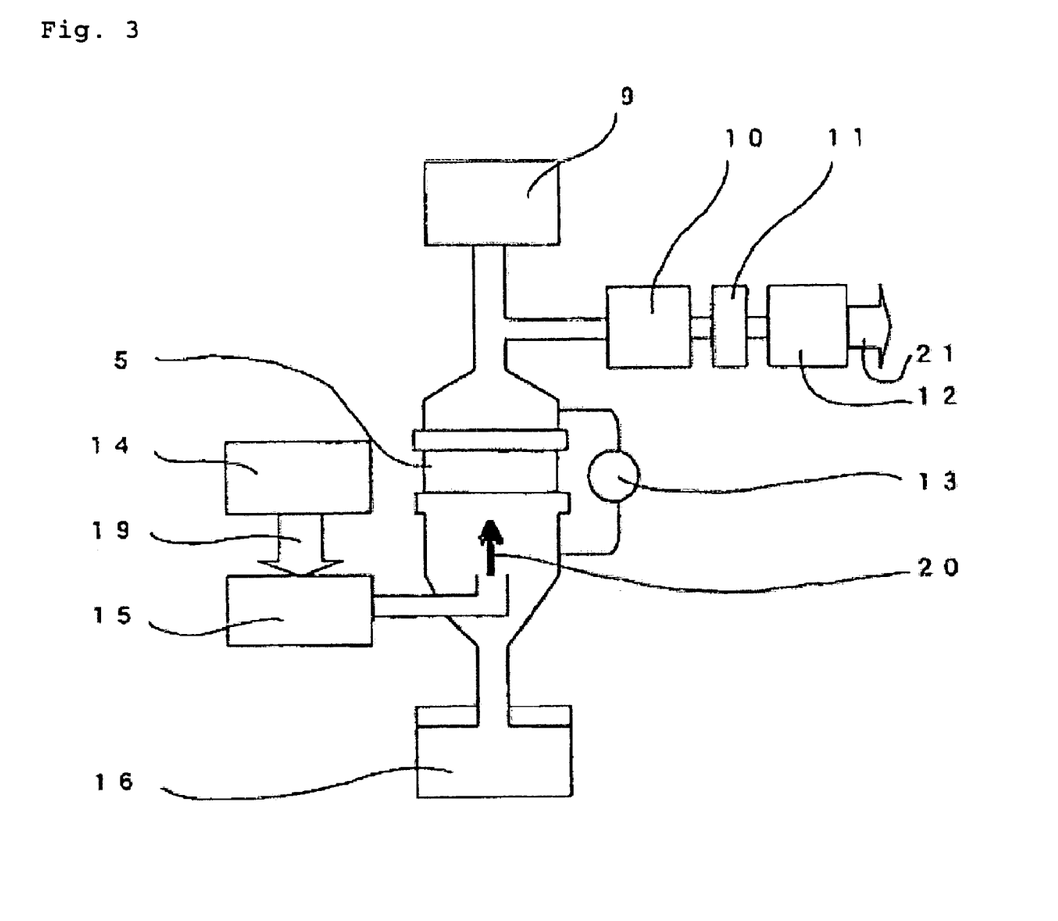
FIG. 3 is a schematic drawing showing an instrument for measuring the pressure loss of the filter fabric after pulse cleaning.

The apparatus of FIG. 3 was used to measure the pressure loss after pulse cleaning. That is, in FIG. 3, an air stream with a filtration air velocity of 2.0 m/min was given to a filter fabric 5 (170 mm diameter) using a vacuum pump 12 and a flow meter 10 installed downstream of the filter fabric 5. JIS Class 10 dust was adjusted to a dust concentration of 20 g/m$^3$ using a dust feeder 14 and a dust dispersing device 15, and it was applied to the dust side of the filter fabric 5 (filtration area 100 cm$^2$). Whenever the pressure loss measured by a digital manometer 13 rose to 100 mm H$_2$O (980 Pa), 155 jet pulses were applied at a pulse jet pressure of 3 kgf/cm$^2$ (294 kPa) for 0.1 second by a pulse jet loading machine 9 installed downstream of the filter fabric 5, and the pressure loss immediately after pulse jet application was continuously monitored by a digital manometer 13.

The pressure loss after pulse cleaning was judged according to the following criterion:
○: Pressure loss after lapse of 30 hours was less than 7 mm H$_2$O (69 Pa)(good).
Δ: Said pressure loss was from 7 mm H$_2$O(69 Pa) to 8 mm H$_2$O (78 Pa) (rather good).
×: Said pressure loss was more than 8 mm H$_2$O (78 Pa) (poor)

[Overall Judgment]

The overall judgment was made according to the following criterion:
×: At least either the dust collecting-efficiency for dust in the air or the pressure loss after pulse cleaning was judged as ×.
○: Both the dust-collecting efficiency for dust in the air and the pressure loss after pulse cleaning were judged as either ○ or Δ.

[Strength of Filter Fabric]

The tensile strength of a filter fabric was measured based on the strip method specified in JIS L 1096. The sample size was 200 mm×50 mm, and the tensile-strength was measured at a stress rate of 100 mm/min at a chuck interval of 100 mm. The measured value was the value of breaking strength in the length direction of the sample (the direction perpendicular to the orientation of the fibers, or the same direction as the warp direction of a scrim if the sample contains the scrim).

[Heat Resistance (Hydrolytic Resistance)]

A sample was treated under the following conditions to obtain the breaking strength retention rate in the length direction of the sample (the direction perpendicular to the orientation of the fibers, or the same direction as the warp direction of a scrim if the sample contains the scrim). The breaking strength retention rate was obtained from the following formula:

Breaking strength retention rate (%)=$A/B$×100

A: Breaking strength of the sample treated in an autoclave
B: Breaking strength of the sample not yet treated in an autoclave The treatment was carried out using an autoclave (produced by Nitto Autoclave) under the following conditions: set temperature 160° C., indicated pressure 6.5 kgf/cm$^2$ (637 kPa) for 200 hours.

[Dimensional Stability]

A sample was cut to have a size of 300 mm (length)×50 mm (width), and a load of 9.8 N was suspended from the sample in the vertical direction in such a manner that the length direction of the sample agreed with the vertical direction, and it was kept in an atmosphere of 240° C. for 1 hour. After completion of said heat treatment, the elongation (creep) in the length direction of the sample was measured. The formula for obtaining the creep was as follows. A creep closer to zero in absolute value indicates better dimensional stability.

Creep (%)={(Length of sample after heat treatment)−300}×100/300

[Fabric Uniformity]

A sample was held against light to visually judge the fabric uniformity and the presence or absence of pinholes and to evaluate according to the following criterion:
○: Good
Δ: Rather good
×: Poor

EXAMPLE 1

PPS staple fibers with a fineness of 3.0 dtex (fiber diameter 17 μm) and a cut length of 76 mm ("TORCON®" S101-3.0T76 mm, produced by Toray Industries, Inc.) were used to obtain a spun yarn (total fineness 600 dtex) having a single yarn count of 20s obtained by doubling two yarns. Yarns, each produced as above, were used to form a PPS spun yarn plain weave fabric with a warp density of 26 threads/2.54 cm and a weft density of 18 threads/2.54 cm. The woven fabric was used as the scrim. Meanwhile, PPS staple fibers with a fineness of 2.2 dtex (fiber diameter 14.5 μm) and a cut length of 51 mm ("TORCON®" S101-2.2T51 mm, produced by Toray Industries, Inc.) and PPS staple fibers with a fineness of 1.0 dtex (fiber diameter 9.7 μm) and a cut length of 51 mm ("TORCON®" S101-1.0T51 mm, produced by Toray Industries, Inc.) were blended at a ratio by weight of 50:50, and the blended staple fibers were treated using an opener and a carding machine, and temporarily needle-punched at a needling density of 50 needles/cm$^2$, to obtain a web. The web was laminated on one surface of the scrim at a weight per unit area of 194 g/m$^2$. The web formed the filtration layer on the dust side. On the other hand, PPS staple fibers with a fineness of 7.8 dtex (fiber diameter 27.2 μm) and a cut length of 51 mm ("TORCON®" S101-7.8T51 mm, produced by Toray Industries, Inc.) only were treated using an opener and a carding machine and temporarily needle-punched at a needling density of 50 needles/cm$^2$, to obtain a web. The web was laminated on the other surface of the woven fabric at a weight per unit area of 220 g/m$^2$. The web formed the filtration layer on the clean side. Furthermore, the laminate was needle-punched to entangle the woven fabric (scrim) and the above-mentioned webs, to obtain a filter fabric with a weight per unit area of 544 g/m$^2$ and a total needling density of 300 needles/cm$^2$. The performance of the obtained filter fabric is shown in Table 1 and FIGS. 4 and 5. The filter fabric obtained here tended to have a weight per unit area higher than a theoretical value since it was contracted by the needle punching treatment.

EXAMPLE 2

PPS staple fibers with a fineness of 1.0 dtex (fiber diameter 9.7 μm) and a cut length of 51 mm, PPS staple fibers with a fineness of 2.2 dtex (fiber diameter 14.5 μm) and a cut length of 51 mm, and PPS staple fibers with a fineness of 7.8 dtex (fiber diameter 27.2 μm) and a cut length of 51 mm were blended at 30:30:40, for being used as the fibers constituting the web on the dust side. Furthermore, PPS staple fibers with a fineness of 2.2 dtex and a cut length of 51 mm and PPS staple fibers with a fineness of 7.8 dtex and a cut length of 51 mm were blended at 50:50 for being used as the fibers constituting the web on the clean side. A filter fabric was obtained by the same method as described for Example 1, except that the above webs were used. The performance of the obtained filter fabric is shown in Table 1 and FIGS. 4 and 5.

EXAMPLE 3

A filter fabric was obtained by the same method as described for Example 1, except that PPS staple fibers with a fineness of 1.0 dtex (fiber diameter 9.7 μm) and a cut length of 51 mm and PPS staple fibers with a fineness of 2.2 dtex (fiber diameter 14.5 μm) and a cut length of 51 mm were blended for being used as the fibers constituting the web on the dust side. The performance of the obtained filter fabric is shown in Table 1 and FIGS. 4 and 5.

EXAMPLE 4

PPS staple fibers with a fineness of 2.2 dtex (fiber diameter 14.5 μm) and a cut length of 51 mm ("TORCON®" S101-2.2T51 mm, produced by Toray Industries, Inc.) and PTFE staple fibers with a fineness of 3.3 dtex (fiber diameter 13.5 μm) and a cut length of 70 mm ("TOYOFLON®"T201-3.3T70 mm, produced by Toray Industries, Inc.) were blended at a ratio by weight of 50:50, and the blended staple fibers were treated using an opener and a carding machine, and temporarily needle-punched at a needling density of 40 needles/cm$^2$, to obtain 210 g/m$^2$ of a web forming the filtration layer on the dust side. A filter fabric with a weight per unit area of 533 g/m$^2$ was produced by the same method as described for Example 1, except that the above web was used. The performance of the obtained filter fabric is shown in Table 1 and FIGS. 4 and 5.

EXAMPLE 5

PPS staple fibers with a fineness of 2.2 dtex (fiber diameter 14.5 μm) and a cut length of 51 mm ("TORCON®" S101-2.2T51 mm, produced by Toray Industries, Inc.) only were treated using an opener and a carding machine, and temporarily needle-punched at a needling density of 40 needles/cm$^2$, to obtain 220 g/m$^2$ of a web forming the filtration layer on the dust side. A filter fabric with a weight per unit area of 494 g/m$^2$ was obtained using PPS staple fibers with a fineness of 7.8 dtex ("TORCON®" S101-7.8T51 mm, produced by Toray Industries, Inc.) by the same method as described for Example 1, except that the above-mentioned web was used. The performance of the obtained filter fabric is shown in Table 1 and FIGS. 4 and 5.

EXAMPLE 6

PPS fibers obtained by a melt spinning method were heat-treated under tension in their drawing step to obtain PPS staple fibers with a Young's modulus of 28 cN/dtex, a fineness of 2.2 dtex (fiber diameter 14.5 μm) and a cut length of 76 mm obtained by an emulsion spinning method (TORCON® produced by Toray Industries, Inc.). The PPS staple fibers and polytetrafluoroethylene staple fibers with a fineness of 3.3 dtex (fiber diameter 13.5 μm) and a cut length of 70 mm (TOYOFLON® produced by Toray Industries, Inc.) were blended at a ratio by weight of 50:50 using an opener, and the blended fibers were fed through a carding machine, to form a sheet-like web. PPS staple fibers with a Young's modulus of 28 cN/dtex, a fineness of 2.2 dtex and a cut length of 76 mm (TORCON® produced by Toray Industries, Inc.) were used to form a spun yarn having a total single yarn count of 20 s obtained by doubling two yarns (total fineness 600 dtex), and yarns, each produced as above, were used to form a plain weave fabric (#2818, warp density 28 threads/2.54 cm, weft density 18 threads/2.54 cm). This woven fabric was used as the scrim. The web and the scrim were laminated in the order of web/scrim/web, and the laminate was needle-punched at 400 needles/cm$^2$, to obtain a felt. The felt was pressed using a hot press roll machine with iron rolls at 100° C. with a clearance of 1.0 mm, to obtain a filter fabric with a weight per unit area of 715 g/m$^2$ and a thickness of 1.42 mm.

The obtained filter fabric was uniform in the fabric uniformity and had few pinholes, being a nonwoven fabric having PPS fibers and polytetrafluoroethylene fibers blended homogeneously.

EXAMPLE 7

A filter fabric with a weight per unit area of 703 g/m$^2$ and a thickness of 1.58 mm were produced by the same method as described for Example 6, except that PPS staple fibers and polytetrafluoroethylene staple fibers used for the sheet-like web were blended at a ratio by weight of 75:25 using an opener. The obtained filter fabric was uniform in the fabric uniformity and had few pinholes, being a nonwoven fabric having PPS fibers and polytetrafluoroethylene fibers blended homogeneously.

EXAMPLE 8

As the polytetrafluoroethylene staple fibers used for a sheet-like web, PROFILEN® type 803/60 with a fineness of 2.7 dtex (fiber diameter 12.2 μm) and a cut length of 60 mm, produced by Lenzing, were used. Furthermore, the PPS staple fibers used for the sheet-like web of Example 6 and said polytetrafluoroethylene staple fibers were blended at a ratio by weight of 25:75 using an opener, to form a sheet-like web. Furthermore, Rastex® Scrim (plain weave fabric using PTFE slit yarns 400 D, having a weaving density of 20 threads/2.54 cm and a weight per unit area of 70 g/m$^2$, produced by Japan GORE-TEX Inc.) was used as the scrim. A filter fabric with a weight per unit area of 722 g/m$^2$ and a thickness of 1.29 mm was obtained by the same method as described for Example 6, except the above-mentioned sheet-like web and scrim were used. The obtained filter fabric was uniform in the fabric uniformity and had few pinholes, being a nonwoven fabric having PPS fibers and polytetrafluoroethylene fibers blended homogeneously. However, the fluff on the surface was somewhat outstanding.

EXAMPLE 9

A filter fabric with a weight per unit area of 408 g/m$^2$ was obtained by the same method as described for Example 1, except that a two-layer structure consisting of the filtration layer on the dust side and the filtration layer on the clean side was employed without using the scrim. The performance of the obtained filter fabric is shown in Table 1 and FIGS. 4 and 5.

EXAMPLE 10

A filter fabric with a weight per unit area of 413 g/m$^2$ was obtained by the same method as described for Example 4, except that a two-layer structure consisting of the filtration layer on the dust side and the filtration layer on the clean side was employed without using the scrim. The performance of the obtained filter fabric is shown in Table 1 and FIGS. 4 and 5.

COMPARATIVE EXAMPLE 1

PPS staple fibers with a fineness of 2.2 dtex (fiber diameter 14.5 μm) and a cut length of 51 mm ("TORCON® "S101-2.2T51 mm, produced by Toray Industries, Inc.) only were treated using an opener and a carding machine, and temporarily needle-punched at a needling density of 40 needles/cm$^2$, to obtain a web with a weight per unit area of 220 g/m$^2$ used to form the filtration layer on the dust side and a web with a weight per unit area of 220 g/m$^2$ used to form the filtration layer on the clean side. A filter fabric with a weight) per unit area of 571 g/m$^2$ was obtained by the same method as described for Example 1, except that the above-mentioned webs were used. The performance of the obtained filter fabric is shown in Table 1 and FIGS. 4 and 5.

COMPARATIVE EXAMPLE 2

PPS staple fibers with a fineness of 7.8 dtex and a cut length of 51 mm ("TORCON®"S101-7.8T51 mm, produced by Toray Industries, Inc.) only were treated using an opener and a carding machine, and temporarily needle-punched at a needling density of 40 needles/cm$^2$, to obtain a web with a weight per unit area of 225 g/m$^2$ used to form the filtration layer on the dust side and a web with a weight per unit area of 228 g/m$^2$ used to form the filtration layer on the clean side. A filter fabric with a weight per unit area of 594 g/m$^2$ was obtained by the same method as described for Example 1, except that the above-mentioned webs were used. The performance of the obtained filter fabric is shown in Table 1 and FIGS. 4 and 5.

COMPARATIVE EXAMPLE 3

PPS staple fibers obtained by a melt spinning method were heat-treated under relaxation in their drawing step, to obtain PPS staple fibers with a Young's modulus of 19 cN/dtex, a fineness of 7.8 dtex (fiber diameter 27.7 μm) and a cut length of 76 mm (TORCON®, produced by Toray Industries, Inc.). The PPS staple fibers were treated using an opener and a carding machine, to form a sheet-like web. As for the scrim, PPS staple fibers with a Young's modulus of 19 cN/dtex (TORCON® with a fineness of 2.2 dtex and a cut length of 76 mm, produced by Toray Industries, Inc.) were used to form a spun yarn (total fineness 600 dtex) having a single yarn count of 20s obtained by doubling two yarns, and yarns, each produced as above, were used to form a plain weave fabric (#2818, warp density 28 threads/2.54 cm and weft density 18 threads/2.54 cm). The web and the scrim were laminated in the order of web/scrim/web, and the laminate was needle-punched at 400 needles/cm², to obtain a felt. The felt was pressed using a hot press roll machine with iron rolls at 100° C. with a clearance of 1.0 mm, to obtain a filter fabric with a weight per unit area of 551 g/m² and a thickness of 1.52 mm.

The obtained filter fabric was a nonwoven fabric uniform in the fabric uniformity but marked with needle holes of the needle punch.

COMPARATIVE EXAMPLE 4

A filter fabric with a weight per unit area of 630 g/m² and a thickness of 1.25 mm was obtained by the same method as described for Comparative Example 2, except that polytetrafluoroethylene staple fibers with a fineness of 7.4 dtex and a cut length of 70 mm obtained by an emulsion spinning method (TOYOFLON® produced by Toray Industries, Inc.) were used as the sheet-like web, and that Rastex® Scrim (plain weave fabric with a weaving density of 20 threads/2.54 cm and a weight per unit area of 70 g/m² using PTFE slit yarns 400 D, produced by Japan GORE-TEX Inc.) was used as the scrim.

The obtained filter fabric was a nonwoven fabric uniform in the fabric uniformity but marked with needle holes of the needle punch.

COMPARATIVE EXAMPLE 5

A filter fabric with a weight per unit area of 558 g/m² and a thickness of 1.53 mm was obtained by the same method as described for Comparative Example 1, except that polyethylene terephthalate staple fibers with a fineness of 2.2 dtex and a cut length of 51 mm (TETORON® produced by Toray Industries, Inc.) were used as the sheet-like web and that no scrim was used.

The obtained filter fabric was a nonwoven fabric uniform in the fabric uniformity but marked with needle holes of the needle punch.

COMPARATIVE EXAMPLE 6

PPS fibers obtained by a melt spinning method were heat-treated under relaxation in their drawing step, to obtain PPS staple fibers with a Young's modulus of 19 cN/dtex, a fineness of 2.2 dtex and a cut length of 76 mm (TORCON® produced by Toray Industries, Inc.). The PPS staple fibers were treated using an opener and a carding machine, to form a sheet-like web. A filter fabric with a weight per unit area of 512 g/m² and a thickness of 1.96 mm was obtained by the same method as described for Comparative Example 2, without using the scrim.

The obtained filter fabric was a nonwoven fabric somewhat non-uniform in the fabric uniformity.

TABLE 1

| | Sample | | Example 1 | Example 2 | Example 3 | Example 4 | Example 5 |
|---|---|---|---|---|---|---|---|
| Web constitution | Dust side | PPS 1.0 T (9.7 μm 28 cN/dtex) | 50 wt % | 30 | 20 | | |
| | | PPS 2.2 T (14.5 μm 28 cN/dtex) | | | | | |
| | | PPS 2.2 T (14.5 μm 19 cN/dtex) | 50 wt % | 30 | 80 | 50 | 100 |
| | | PPS 7.8 T (27.2 μm 19 cN/dtex) | | 40 | | | |
| | | Fluorine 3.3 T (13.5 mm) | | | | 50 | |
| | | Fluorine 7.4 T (20.2 μm) | | | | | |
| | | Fluorine 2.7 T (12.2 μm) | | | | | |
| | | PET 2.2 T (14.2 μm) | | | | | |
| | | glass 0.3 T (6 μm) | | | | | |
| | Clean side | PPS 2.2 T (14.5 μm 28 cN/dtex) | | | | | |
| | | PPS 2.2 T (14.5 μm 19 cN/dtex) | | 50 | | | |
| | | PPS 7.8 T (27.2 μm 19 cN/dtex) | 100 wt % | 50 | 100 | 100 | 100 |
| | | Fluorine 3.3 T (13.5 μm) | | | | | |
| | | Fluorine 7.4 T (20.2 μm) | | | | | |
| | | Fluorine 2.7 T (12.2 μm) | | | | | |
| | | PET 2.2 T (14.2 μm) | | | | | |
| | | glass 0.3 T (6 μm) | | | | | |
| Scrim constitution | | PPS 2.2 T (Young's modulus 28 cN/dtex) | | | | | |
| | | PPS 2.2 T (Young's modulus 19 cN/dtex) | Used | Used | Used | Used | Used |
| | | PTFE Rastex | | | | | |
| Weight per unit area (g/m²) | | | 544 | 528 | 540 | 533 | 494 |
| Thickness (mm) | | | 2.7 | 2.6 | 2.6 | 2.4 | 2.4 |
| Apparent density (g/cm³) | | | 0.20 | 0.20 | 0.21 | 0.22 | 0.21 |
| Stiffness (mN) | | | 63 | 65 | 69 | 71 | 69 |
| Burst strength (kPa) | | | 4200 | 4160 | 4380 | 4440 | 4540 |
| Air permeability (cc/cm² · sec) | | | 39.8 | 43 | 45 | 35 | 46.4 |
| Pressure loss (mm H₂O at 1 m/min) | | | 0.46 | 0.48 | 0.47 | 0.46 | 0.48 |
| (mm H₂O at 2 m/min) | | | 0.89 | 0.95 | 0.92 | 0.9 | 0.85 |
| Collection efficiency (%) | | | ◯ | Δ | Δ | ◯ | Δ |
| Pressure loss after pulse cleaning | | | Δ | ◯ | ◯ | Δ | ◯ |
| Overall judgment | | | ◯ | ◯ | ◯ | ◯ | ◯ |
| Strength (tensile) (N/5 cm) | | | — | — | — | — | — |
| Heat resistance (Hydrolytic resistance) (%) | | | — | — | — | — | — |
| Dimensional stability (%) | | | — | — | — | — | — |
| Fabric uniformity | | | — | — | — | — | — |

| | Sample | | Example 6 | Example 7 | Example 8 | Example 9 | Example 10 |
|---|---|---|---|---|---|---|---|
| Web constitution | Dust side | PPS 1.0 T (9.7 μm 28 cN/dtex) | | | | 50 | |
| | | PPS 2.2 T (14.5 μm 28 cN/dtex) | 50 | 75 | 25 | | |
| | | PPS 2.2 T (14.5 μm 19 cN/dtex) | | | | 50 | 50 |

TABLE 1-continued

|  |  |  | | | | | |
|---|---|---|---|---|---|---|---|
| | | PPS 7.8 T (27.2 μm 19 cN/dtex) | | | | | |
| | | Fluorine 3.3 T (13.5 mm) | 50 | 25 | | | 50 |
| | | Fluorine 7.4 T (20.2 μm) | | | | | |
| | | Fluorine 2.7 T (12.2 μm) | | | 75 | | |
| | | PET 2.2 T (14.2 μm) | | | | | |
| | | glass 0.3 T (6 μm) | | | | | |
| | Clean side | PPS 2.2 T (14.5 μm 28 cN/dtex) | | | 25 | | |
| | | PPS 2.2 T (14.5 μm 19 cN/dtex) | 50 | 75 | | | |
| | | PPS 7.8 T (27.2 μm 19 cN/dtex) | | | | 100 | 100 |
| | | Fluorine 3.3 T (13.5 μm) | 50 | 25 | | | |
| | | Fluorine 7.4 T (20.2 μm) | | | | | |
| | | Fluorine 2.7 T (12.2 μm) | | | 75 | | |
| | | PET 2.2 T (14.2 μm) | | | | | |
| | | glass 0.3 T (6 μm) | | | | | |
| Scrim constitution | | PPS 2.2 T (Young's modulus 28 cN/dtex) | Used | Used | | | |
| | | PPS 2.2 T (Young's modulus 19 cN/dtex) | | | | | |
| | | PTFE Rastex | | | Used | | |
| Weight per unit area (g/m²) | | | 715 | 703 | 722 | 408 | 413 |
| Thickness (mm) | | | 1.42 | 1.58 | 1.29 | 2.2 | 1.9 |
| Apparent density (g/cm³) | | | 0.50 | 0.44 | 0.56 | 0.19 | 0.22 |
| Stiffness (mN) | | | — | — | — | 44 | 50 |
| Burst strength (kPa) | | | — | — | — | 3370 | 3550 |
| Air permeability (cc/cm²·sec) | | | 14.7 | 15.2 | 13.8 | 47 | 42 |
| Pressure loss (mm H₂O at 1 m/min) | | | — | — | — | 0.55 | 0.51 |
| (mm H₂O at 2 m/min) | | | — | — | — | 1.09 | 1.01 |
| Collection efficiency (%) | | | 63.2 | 61.2 | 62 | Δ | Δ |
| Pressure loss after pulse cleaning | | | — | — | — | ○ | ○ |
| Overall judgment | | | — | — | — | ○ | ○ |
| Strength (tensile) (N/5 cm) | | | 862 | 892 | 824 | — | — |
| Heat resistance (Hydrolytic resistance) (%) | | | 102 | 102 | 105 | — | — |
| Dimensional stability (%) | | | 0.9 | 1.1 | 0.4 | — | — |
| Fabric uniformity | | | ○ | ○ | ○ | — | — |

| | | Sample | Comparative Example 1 | Comparative Example 2 | Comparative Example 3 | Comparative Example 4 | Comparative Example 5 | Comparative Example 6 |
|---|---|---|---|---|---|---|---|---|
| Web constitution | Dust side | PPS 1.0 T (9.7 μm 28 cN/dtex) | | | | | | |
| | | PPS 2.2 T (14.5 μm 28 cN/dtex) | | | | | | |
| | | PPS 2.2 T (14.5 μm 19 cN/dtex) | 100 | | | | | 100 |
| | | PPS 7.8 T (27.2 μm 19 cN/dtex) | | 100 | 100 | | | |
| | | Fluorine 3.3 T (13.5 mm) | | | | | | |
| | | Fluorine 7.4 T (20.2 μm) | | | | 100 | | |
| | | Fluorine 2.7 T (12.2 μm) | | | | | | |
| | | PET 2.2 T (14.2 μm) | | | | | 100 | |
| | | glass 0.3 T (6 μm) | | | | | | |
| | Clean side | PPS 2.2 T (14.5 μm 28 cN/dtex) | | | | | | |
| | | PPS 2.2 T (14.5 μm 19 cN/dtex) | 100 | | | | | 100 |
| | | PPS 7.8 T (27.2 μm 19 cN/dtex) | | 100 | 100 | | | |
| | | Fluorine 3.3 T (13.5 μm) | | | | | | |
| | | Fluorine 7.4 T (20.2 μm) | | | | 100 | | |
| | | Fluorine 2.7 T (12.2 μm) | | | | | | |
| | | PET 2.2 T (14.2 μm) | | | | | 100 | |
| | | glass 0.3 T (6 μm) | | | | | | |
| Scrim constitution | | PPS 2.2 T (Young's modulus 28 cN/dtex) | | | | | | |
| | | PPS 2.2 T (Young's modulus 19 cN/dtex) | Used | Used | Used | | | |
| | | PTFE Rastex | | | | Used | | |
| Weight per unit area (g/m²) | | | 571 | 594 | 551 | 630 | 558 | 512 |
| Thickness (mm) | | | 2.7 | 2.9 | 1.52 | 1.25 | 1.53 | 1.96 |
| Apparent density (g/cm³) | | | 0.21 | 0.20 | 0.36 | 0.50 | 0.37 | 0.26 |
| Stiffness (mN) | | | 53 | 88 | — | — | — | — |
| Burst strength (kPa) | | | 2900 | 6120 | — | — | — | — |
| Air permeability (cc/cm²·sec) | | | 30 | 59.9 | 19 | 23.9 | 11.5 | 14.8 |
| Pressure loss (mm H₂O at 1 m/min) | | | 0.79 | 0.31 | — | — | — | — |
| (mm H₂O at 2 m/min) | | | 1.52 | 0.6 | — | — | — | — |
| Collection efficiency (%) | | | x | x | 46.1 | 48.2 | 50.7 | 48.2 |
| Pressure loss after pulse cleaning | | | x | ○ | — | — | — | — |
| Overall judgment | | | x | x | — | — | — | — |
| Strength (tensile) (N/5 cm) | | | — | — | 970 | 796 | 487 | 443 |
| Heat resistance (Hydrolytic resistance) (%) | | | — | — | 102 | 104 | Could not be | 103 |
| Dimensional stability (%) | | | — | — | 2.8 | 0.4 | 5.8 | 3.3 |
| Fabric uniformity | | | — | — | Δ | Δ | Δ | Δ |

Figure 4:
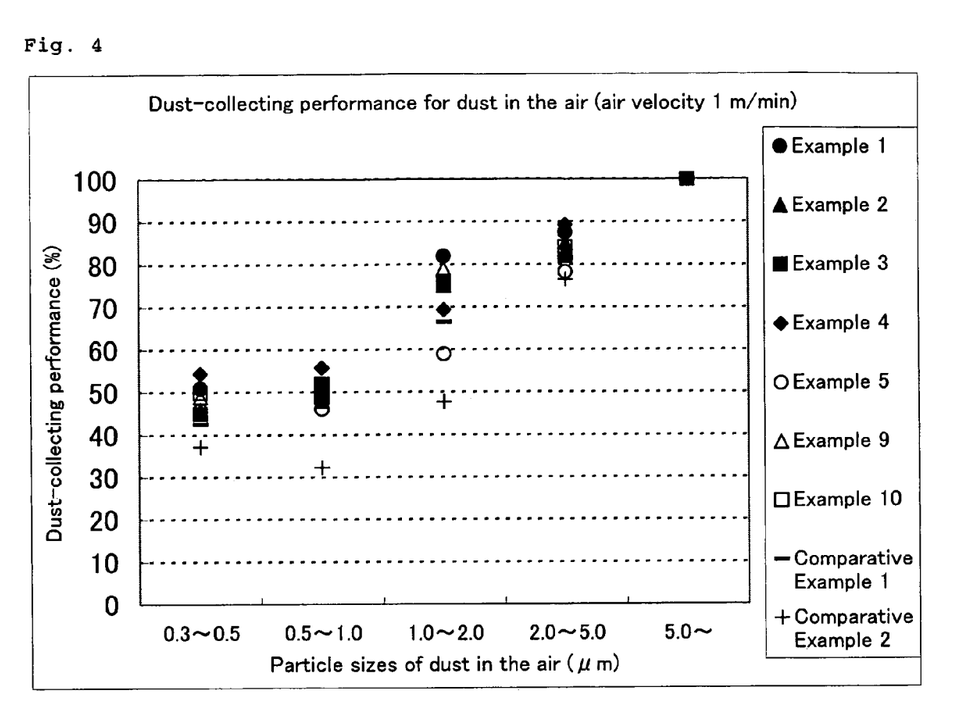
FIG. 4 shows the results of measuring the dust-collecting efficiencies of the filter fabrics of this invention for dust in the air at an air velocity of 1 m/min.
Figure 5:
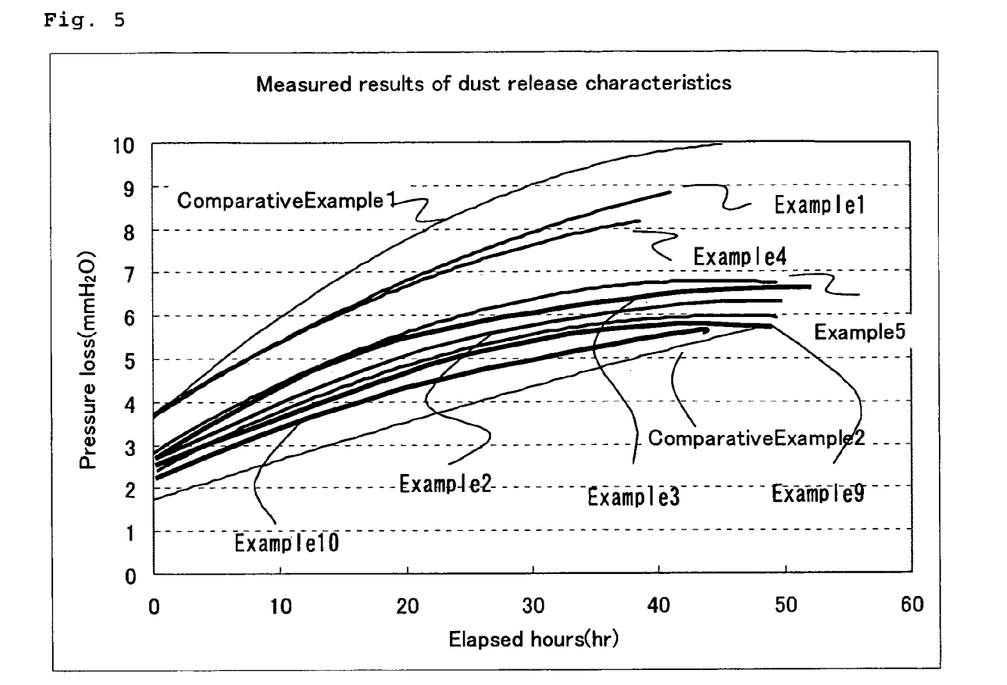
FIG. 5 shows the results of measuring the pressure losses of the filter fabrics after pulse cleaning at an air velocity of 2 m/min.

From the evaluation results of Table 1 and FIGS. 4 and 5, it can be seen that the filter fabrics of Examples 1 to 5 are high in dust-collecting efficiency and also high in burst strength and Gurley stiffness compared with the filter fabrics of Comparative Examples 1 and 2, and also gentle in the rise of pressure loss after pulse cleaning. Since the filter fabrics are excellent in mechanical strength, they are strong against the stress acting during pulse cleaning and also against the wear with the cage, and do not become high in pressure loss even if they are continuously used with intermittent pulse cleaning. So, the filters can be elongated in life. Furthermore, as can be seen from Examples 9 and 10, the filter fabrics have sufficient mechanical strength even though they do not contain any scrim. Moreover, it can be seen that the filter fabrics of Examples 6 to 8 are high in dust-collecting efficiency, high in hydrolytic resistance and high in dimensional stability at high temperature and uniform in the fabric uniformity and have few pinholes, compared with the filter fabrics of Comparative Examples 3 to 6.

INDUSTRIAL APPLICABILITY

We provide a filter fabric containing polyphenylene sulfide fibers, comprising at least two webs, one of which on the dust side contains 50 wt % or more of heat resistant fibers with a fiber diameter of 15 μm or less, while the other web on the clean side contains 50 wt % or more of heat resistant fibers with a fiber diameter of 20 μm or more. So, the filter fabric is excellent in dust-collecting efficiency, small in the rise of pressure loss after pulse cleaning and excellent in mechanical strength.

Furthermore, we provide a filter fabric containing polyphenylene sulfide fibers, comprising a web containing polyphenylene sulfide staple fibers with their fineness kept in a range from 1 to 3 dtex and fluorine-based staple fibers with their fineness kept in a range from 2 to 4 dtex. So, the filter fabric is excellent in dust-collecting efficiency, excellent in thermal dimensional stability at high temperature and uniform in the fabric uniformity, and has few defects such as pinholes.

Furthermore, since the bag filter comprises said filter fabric, it is excellent in the efficiency of collecting the dust contained in an exhaust gas, and high and excellent in mechanical strength such as abrasion resistance to the cage, burst strength, stiffness and dimensional stability. So, the life of the filter can be elongated.

The filter fabric or the bag filter can be suitably used as the dust collecting filter cloth or as the bag filter composed of the filter cloth, for filtering especially the high temperature exhaust gas discharged from a refuse incinerator, coal boiler, metal blast furnace or the like.

The invention claimed is:

1. A filter fabric containing polyphenylene sulfide fibers comprising at least two webs forming a dust side and a clean side, wherein the web of the dust side comprises 30 wt % or more of a first set of heat resistant fibers with a fiber diameter of 10 to 15 μm and 20 wt % or more of a second set of heat resistant fibers with a fiber diameter of less than 10 μm, and the web of the clean side comprises 50 wt % or more of heat resistant fibers with a fiber diameter of 20 μm or more.

2. The filter fabric according to claim 1, wherein the heat resistant fibers are at least one selected from para-aramid fibers, meta-aramid fibers, polyphenylene sulfide fibers, polyimide fibers, fluorine-based fibers, carbon fibers and glass fibers.

3. The filter fabric according to claim 1, wherein the web on the dust side contains 10 to 90 wt % of polyphenylene sulfide fibers and 10 to 90 wt % of fluorine-based fibers.

4. The filter fabric according to claim 3, wherein at least one of the webs contains polyphenylene sulfide staple fibers with their fineness in a range from 1 to 3 dtex and fluorine-based staple fibers with their fineness in a range from 2 to 4 dtex.

5. The filter fabric according to claim 1, wherein the fibers on a surface of at least one of the webs are partially fused.

6. The filter fabric according to claim 1, wherein the webs are laminated on both sides of a scrim composed of heat resistant fibers to form at least a three-layer structure.

7. The filter fabric according to claim 6, Wherein the scrim is a woven fabric composed of heat resistant fibers.

8. The filter Fabric according to claim 6, wherein the scrim contains fibers made from at least one of polyphenylene sulfide fibers and fluorine-based fibers.

9. The filter fabric according to claim 6, wherein the heat resistant fibers constituting the scrim are spun polyphenylene sulfide yarns, the total fineness of which is kept in range from 100 to 1000 dtex.

10. The filter fabric according to claim 1, wherein the Young's modulus of the polyphenylene sulfide fibers is 20 cN/dtex or more.

11. The filter fabric according to claim 2, wherein the fluorine-based fibers are polytetrafluoroethylene fibers.

12. A bag filter fabric produced by sewing the filter fabric as set forth in claim 1 as a bag.

13. A filter fabric which comprises a web containing polyphenylene sulfide staple fibers having a fineness of 1 to 2.3 dtex and fluorine-based staple fibers having a fineness of 2.5 to 4 dtex.

14. The filter fabric according to claim 13, wherein polyphenylene sulfide staple fibers and fluorine-based staple fibers are blended to form a web.

15. The filter fabric according to claim 13, wherein the total weight of polyphenylene sulfide fibers and fluorine-based fibers in a web as a whole is 70 wt % or more.

* * * * *